(12) United States Patent
Myles et al.

(10) Patent No.: US 8,952,126 B2
(45) Date of Patent: Feb. 10, 2015

(54) PURIFICATION OF FUNCTIONALIZED TRIBLOCK COPOLYMERS VIA METHANOL TRITURATION

(71) Applicants: Xerox Corporation, Norwalk, CT (US); National Research Council of Canada, Ottawa (CA)

(72) Inventors: Andrew J. Myles, Edmonton (CA); Karen A. Moffat, Brantford (CA); Jordan H. Wosnick, Toronto (CA); Valerie M. Farrugia, Oakville (CA)

(73) Assignees: Xerox Corporation, Norwalk, CT (US); National Research Council of Canada (CA)

( * ) Notice: Subject to any disclaimer, the term of this patent is extended or adjusted under 35 U.S.C. 154(b) by 16 days.

(21) Appl. No.: 13/938,874

(22) Filed: Jul. 10, 2013

(65) Prior Publication Data

US 2015/0018498 A1    Jan. 15, 2015

(51) Int. Cl.
| | | |
|---|---|---|
| C08F 6/10 | (2006.01) | |
| C08F 6/28 | (2006.01) | |
| C08F 6/12 | (2006.01) | |
| C08F 6/08 | (2006.01) | |
| C08G 63/88 | (2006.01) | |
| C08G 63/89 | (2006.01) | |
| C08G 63/91 | (2006.01) | |

(52) U.S. Cl.
CPC ................... C08G 63/912 (2013.01)
USPC ............. 528/502 A; 526/67; 526/68; 526/69; 526/70; 526/71; 528/502 R; 528/495; 528/496; 528/271; 528/274; 528/371; 528/354; 528/359; 525/413; 525/410; 525/417; 525/419; 525/439

(58) Field of Classification Search
CPC ........ C08G 63/88; C08G 63/89; C08G 63/90; C08G 64/40; C08G 64/403; C08G 64/406; C08G 65/30; C08G 65/46; C08G 75/0277; C08G 75/0281; C08G 77/32; C08G 77/34; C08G 2261/71; C08J 11/02; C08J 11/04; C08J 11/06; C08J 11/08
USPC ................ 526/67, 68, 69, 70, 71; 528/502 R, 528/502 A, 495, 496, 271, 274, 370, 371, 528/354, 359, 310, 323, 326, 355; 525/413; 525/410, 417, 419, 439; 532/950–955; 264/37.18, 37.19, 37.24
See application file for complete search history.

(56) References Cited

U.S. PATENT DOCUMENTS

| | | | | |
|---|---|---|---|---|
| 5,386,004 | A * | 1/1995 | Obuchi et al. .................. | 528/354 |
| 5,618,911 | A * | 4/1997 | Kimura et al. ................ | 528/361 |
| 6,855,770 | B2 * | 2/2005 | Pinchuk et al. ............... | 525/240 |
| 2010/0158981 | A1 * | 6/2010 | Guo et al. ..................... | 424/426 |

OTHER PUBLICATIONS

Chickos et al. (Common Laboratory Techniques, University of Missouri St Louis Lab Procedures, Oct. 1999).*
Jia et al. (Synthesis and characterization of tercopolymers derived from e-caprolactone, trimethylene carbonate and lactide, Polymers for Advanced Technologies, 19, 159-166, Feb. 2008).*
Mindemark, (Functional Cyclic Carbonate Monomers and Polycarbonates: Synthesis and Biomaterial Applications, Uppsala Universitet Dissertation, p. 11-19, Apr. 2012).*
Pounder et al., "Towards poly(ester) nanoparticles: recent advances in the synthesis of functional poly(ester)s by ring-opening polymerization," Polymer Chemistry, 2010, vol. 1, pp. 260-271.
Dove, "Controlled ring-opening polymerisation of cyclic esters: polymer blocks in self-assembled nanostructures," Chem. Commun., 2008, pp. 6446-6470.
Kolishetti et al., "Engineering of self-assembled nanoparticle platform for precisely controlled combination drug therapy," PNAs, 2010, vol. 107, No. 42, pp. 17939-17944.
Nottelet et al., "Fully Biodegradable Polymeric Micelles Based on Hydrophobic-and Hydrophilic-Functionalized Poly(lactide) Block Copolymers," Journal of Polymer Science: Part A: Polymer Chemistry, 2010, vol. 48, pp. 3244-3254.
Hao et al., "Temperature-sensitive aliphatic polyesters: synthesis and characterization of δ-substitute caprolactone monomers and polymers," J. Mater. Chem., 2011, vol. 21, pp. 10623-10628.
Noga et al., "Synthesis and Modification of Functional Poly(lactide) Copolymers: Toward Biofunctional Materials," Biomacromolecules, 2008, vol. 9, pp. 2056-2062.
Thillaye du Boullay et al., "An Activated Equivalent of Lactide toward Organocatalytic Ring-Opening Polymerization," J. Am. Chem. Soc., 2006, vol. 128, pp. 16442-16443.
Leemhuis et al., "Functionalized Poly(α-hydroxy acid)s via Ring-Opening Polymerization: Toward Hydrophillic Polyesters with Pendant Hydroxyl Groups," Macromolecules, 2006, vol. 39, pp. 3500-3508.

* cited by examiner

*Primary Examiner* — Randy Gulakowski
*Assistant Examiner* — Christopher M Rodd
(74) *Attorney, Agent, or Firm* — Pillsbury Winthrop Shaw Pittman LLP

(57) ABSTRACT

A method of making a pure block copolymer includes forming a crude block copolymer; heating a solution of the crude block copolymer and alcohol; and cooling the solution to promote precipitation of a purified block copolymer, wherein an amount of impurities remaining in the purified block copolymer is from about 0 to about 5 wt % based on a total weight of the purified block copolymer; a ratio of a polydispersity index of the crude block copolymer to a polydispersity index of the purified block copolymer is from about 1.02 to about 1.25; a ratio of a molecular weight of the crude block copolymer to a molecular weight of the purified block copolymer is from about 0.75 to about 1.0; and a ratio of a number average molecular weight of the crude block copolymer to a number average molecular weight of the purified block copolymer is from about 0.65 to about 1.

15 Claims, 2 Drawing Sheets

PURIFICATION OF FUNCTIONALIZED TRIBLOCK COPOLYMERS VIA METHANOL TRITURATION

TECHNICAL FIELD

The present disclosure is generally related to polyester synthesis, and more specifically, to the purification of block copolymers.

BACKGROUND

Self-assembly of polymeric nanoparticles from readily available and environmentally friendly materials is an active area of research across several disciplines. Specifically, block copolymer self-assembly using biodegradable components is an attractive means to generate discrete nanostructured materials for applications ranging from commodity items to drug delivery systems.

Aliphatic polyesters, such as polycaprolactone and polylactide generated by ring-opening polymerization, represent a particularly promising class of non-toxic and biodegradable polymers and, thus, their functionalization and self-assembly is a promising approach to generate complex soft materials, as described in Pounder et al., *Polym. Chem.* 2010, Vol. 1, pages 260-271; Dove, *Chem. Commun.* 2008, pages 6446-6470; Klishetti et al., *PNAS* 2010, Vol. 107, pages 17939-17944; and Nottelet et al., *J. Pol. Sci. A: Polym. Chem.* 2010, Vol. 48, pages 3244-3254. However, the functionalization of caprolactones and lactides remains a challenge, requiring multi-step syntheses and/or non-scaleable processes that produce poor yields, as described in Hao et al. *J. Mat. Chem.* 2011, Vol. 21, pages 10623-10628; Noga et al., *Biomacromolecules,* 2008, Vol. 9, pages 2056-2062; Thillaye du Boullay et al., *J. Am. Chem. Soc.* 2006, Vol. 128, pages 16442-16443; and Leemhuis et al., *Macromolecules* 2006, Vol. 39, pages 3500-3508.

SUMMARY

Provided is a method of purifying a block copolymer comprising heating a solution containing a crude block copolymer and an alcohol; and cooling the solution to promote precipitation of a purified block copolymer, wherein an amount of impurities remaining in the purified block copolymer is from about 0 to about 5 wt % based on a total weight of the purified block copolymer; a ratio of a polydispersity index (PDI) of the crude block copolymer to a PDI of the pure block copolymer is from about 1.02 to about 1.25; a ratio of a molecular weight of the crude block copolymer to a molecular weight of the purified block copolymer is from about 0.75 to about 1.0; and a ratio of a number average molecular weight of the crude block copolymer to a number average molecular weight of the purified block copolymer is from about 0.65 to about 1.0.

Also provided is a method of making a pure block copolymer comprising forming a crude block copolymer; heating a solution of the crude block copolymer and an alcohol; and cooling the solution to promote precipitation of a purified block copolymer, wherein an amount of impurities remaining in the purified block copolymer is from about 0 to about 5 wt % based on a total weight of the purified block copolymer; a ratio of a PDI of the crude block copolymer to a PDI of the pure block copolymer is from about 1.02 to about 1.25; a ratio of a molecular weight of the crude block copolymer to a molecular weight of the purified block copolymer is from about 0.75 to about 1.0; and a ratio of a number average molecular weight of the crude block copolymer to a number average molecular weight of the purified block copolymer is from about 0.65 to about 1.0.

EMBODIMENTS

Figure 1:
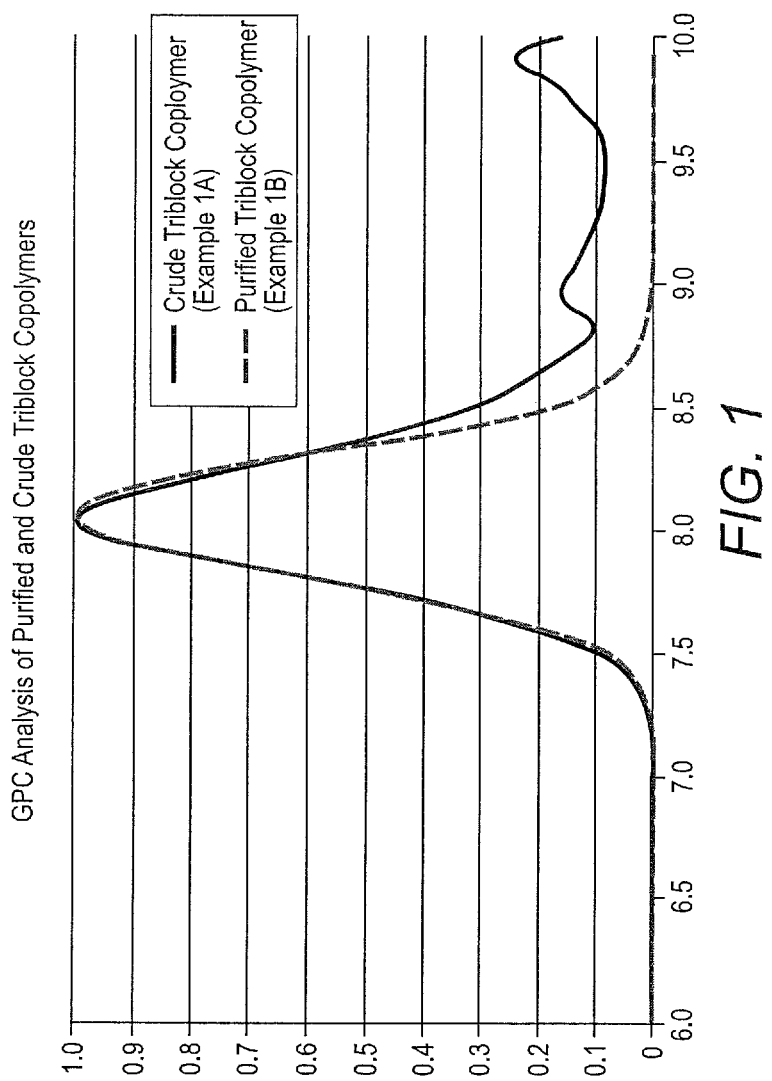
FIG. 1 is a graphical representation of a gel permeation chromatography (GPC) analysis of crude Example 1A and purified triblock copolymers Example 1B.

Purifying a block copolymer by a trituration method comprising heating a solution of a crude mixture containing the block copolymer and an alcohol, and cooling the solution to precipitate a purified block copolymer, results in a block copolymer having a number of advantages over block copolymers that are not purified. Particularly, purifying the block copolymer as disclosed results in the removal of impurities from the block copolymer, while maintaining (1) low polydispersity, (2) control over the molecular weight, and (3) the structural integrity of the polymer molecule.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

The term "block copolymer" refers to a triblock copolymer having a polycaprolactone block, a polycarbonate block, and a polylactide block, or to a diblock copolymer containing any two of these blocks.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Producing Block Copolymers

Block copolymers may be produced by any known means. For example, block copolymers may be produced using ring-opening polymerization. As shown below, ring-opening polymerization generally is a form of chain-growth polymerization, in which the terminal end of a polymer acts as a reactive center and further cyclic monomers join to form a larger polymer chain through ionic propagation.

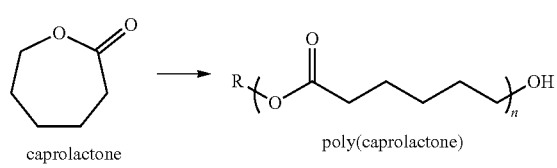

caprolactone → poly(caprolactone)

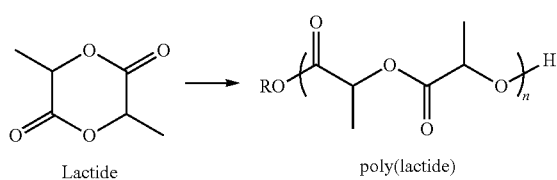

Lactide → poly(lactide)

Ring opening polymerization of lactides and lactones may be performed in an organic solution under stringent conditions. A suitable catalyst may be used to promote the efficient polymerization of the polymers. Suitable catalysts includes metal containing catalysts, such as tin tetrachloride, stannous octoate, tetraphenyltin, and aluminum triisopropoxide; organic catalysts, such as 4-(dimethylamino)pyridine (DMAP), and DMAP:HX (X=$O_3SCF_3$, Cl, or $O_3SCH_3$); metal-free organic catalysts, such as tertiary amines and phosphines; and N-heterocyclic carbenes.

Self-assembly of ABC block copolymers in an aqueous medium, wherein the B block is a short piece with pendant functionality, may be done by, for example, synthesizing an ABC block copolymer via a one-pot, organocatalytic, neat ring-opening polymerization of ε-caprolactone, a functionalized carbonate monomer, and D,L-lactide.

the mixture to a container, and cooling the clear melt to room temperature to form a crude solid block copolymer.

Sequentially adding the monomers may include adding a first monomer A, a catalyst, and an optional solvent to a reactor to form a first reaction mixture, heating the first reaction mixture, allowing a first block to polymerize to form an A block polymer, adding a second monomer B to the first mixture to form a second reaction mixture, allowing a second block to polymerize to form an AB block copolymer, adding a third monomer C to the second reaction mixture to form a third reaction mixture, and allowing a third block to polymerize to form an ABC block copolymer.

The first mixture may be heated to a temperature of from about 125° C. to about 145° C., such as from about 125° C. to about 132° C., from about 130° C. to about 140° C., from about 130° C. to about 140° C., or from about 137° C. to about 145° C. Heating may be done, for example, in an oil bath.

Each of the first block, the second block, and the third block may be allowed to polymerize for about 20 min to about 72 hours, such as for about 20 min to about 50 hours, for about 20 min to about 40 min, or for about 36 to about 72 hours.

The second block and third block may be allowed to polymerize, while the temperature of the second reaction mixture and the third reaction mixture, respectively, is maintained at a temperature from about 125° C. to about 145° C., such as from about 125° C. to about 132° C., from about 130° C. to about 140° C., from about 130° C. to about 140° C., or from about 137° C. to about 145° C.

The anhydride may be allowed to react with the third reaction mixture for about 2 to about 12 min, such as from about 2 to about 6 min, from about 5 to about 9 min, or from about 8 to about 12 min to form a fourth reaction mixture, while maintaining the temperature of the fourth reaction mixture at a temperature of from about 125° C. to about 145° C.,

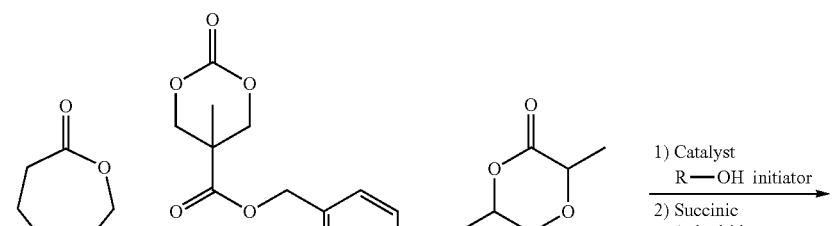

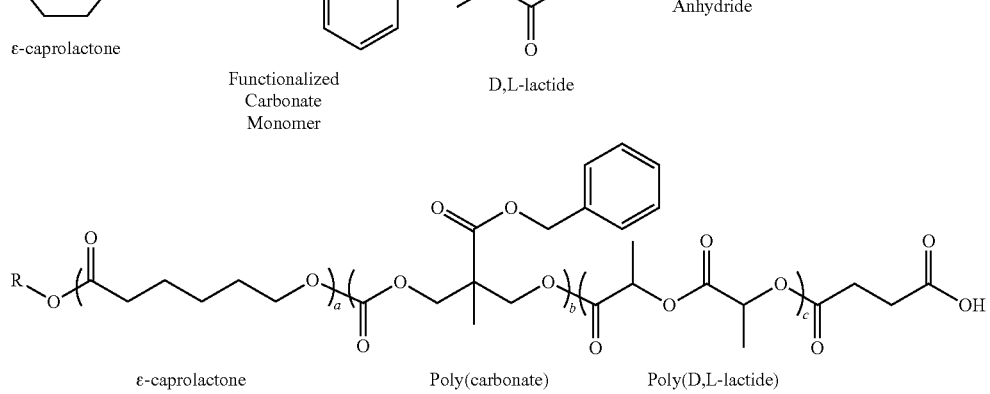

The ring-opening polymerization may include sequentially adding three monomers (A, B, and C) to a reactor to form a mixture, capping the mixture with a diacid, anhydride, or diester, allowing the diacid, anhydride, or diester to react with the mixture to form a clear melt, optionally transferring such as from about 125° C. to about 132° C., from about 130° C. to about 140° C., from about 130° C. to about 140° C., or from about 137° C. to about 145° C., forming a clear melt comprising a capped ABC tri-block copolymer.

Any monomer suitable for forming a block copolymer may be used as a first monomer, a second monomer, and/or a third monomer. Suitable monomers for the first monomer include ε-caprolactone, one or more isomers of lactide, glycolide, trimethylene carbonate, substituted trimethylene carbonate, and the like. The first monomer may be added to the reactor in an amount of from about 2 to about 95 wt %, such as from about 10 to about 50 wt %, or from about 25 to about 45 wt %, based on a total weight of the mixture.

Suitable catalysts include 4-dimethylaminopyridine (DMAP), DMAP:$HO_3SCF_3$, tertiary amines, tertiary phosphines, N-heterocyclic carbenes, tin-based complexes, aluminum-based complexes, and mixtures thereof. The catalyst may be added to the reactor in an amount of from about 0.1 to about 10 wt %, such as from about 0.1 to about 5 wt %, or from about 0.1 to about 1 wt %, based on a total weight of the mixture.

Suitable initiators include hexanol, butanol, ethanol, benzyl alcohol, and other aliphatic alcohols. The initiator may be added to the reactor in an amount of from about 0.1 to about 10 wt %, such as from about 0.1 to about 5 wt %, or from about 0.1 to about 1 wt %, based on a total weight of the mixture.

Suitable monomers for the second monomer include ε-caprolactone, one or more isomers of lactide, glycolide, trimethylene carbonate, substituted trimethylene carbonate, and the like, the monomer chosen being different from that selected as the first monomer. The second monomer may include functionalized carbonate monomers, such as a benzyloxy-carbonyl cyclic carbonate monomer. The second monomer may be added to the reactor in an amount of from about 2 to about 95 wt %, such as from about 10 to about 50 wt %, or from about 10 to about 20 wt %, based on a total weight of the mixture.

As used herein, a functionalized monomer refers to a monomer containing at least one functional group, such as an alcohol group, an amine group, a carboxylic acid group, and a carboxylic ester group. The functional group may be present in a protected form, wherein the protective group is removed at a later stage to provide chemical functionality.

Suitable monomers for the third monomer include ε-caprolactone, one or more isomers of lactide, glycolide, trimethylene carbonate, substituted trimethylene carbonate, and the like, the monomer chosen being different from those selected as the first or second monomer. The third monomer may be added to the reactor in an amount of from about 2 to about 95 wt %, such as from about 20 to about 70 wt %, or from about 30 to about 60 wt %, based on a total weight of the mixture.

Suitable anhydrides include succinic anhydride, maleic anhydride, glutaric anhydride, phthalic anhydride, naphthalenedicarboxylic acid anhydride, trimellitic anhydride, acetic anhydride, aliphatic anhydrides, and mixtures thereof. The anhydride may be added to the reactor in an amount of from about 0.1 to about 10 wt %, such as from about 0.1 to about 2 wt %, or from about 0.1 to about 1 wt %, based on a total weight of the mixture.

Purifying the Crude Block Copolymer

Purifying the crude block copolymer comprises a trituration method including adding alcohol to the crude block copolymer to form a solution, heating the solution to reflux such that no precipitate is observed, cooling the solution to promote precipitation of a purified block copolymer, and isolating the purified block copolymer.

Suitable alcohols include methanol, ethanol, 1-propanol, 2-propanol, or mixtures thereof, including mixtures of one or more alcohols with water. The alcohol may be added to the crude block copolymer in an amount of from about 0.5 to about 50 times the mass of the crude block copolymer, such as from about 1 to about 10 times the mass of the crude block copolymer, or from about 2 to about 5 times the mass of the crude block copolymer.

The solution may be heated to boiling, such as to a temperature of from about 50° C. to about 120° C., such as from about 50° C. to about 100° C., from about 50° C. to about 90° C. depending on the boiling point of the alcohol or alcohol mixture chosen. Boiling may occur for from about 0.1 to about 5 hours, such as from about 0.1 to about 0.5 hours, from about 0.1 to about 0.2 hours.

The solution may be cooled to a temperature of from about −30° C. to about 10° C., such as from about −20° C. to about 5° C., or from about −10° C. to about 5° C., to promote precipitation of the purified block copolymer. The solution may be cooled for a period of from about 0.5 to about 20 hours, such as from about 8 to about 14 hours, from about 12 to about 18 hours, or from about 16 to about 20 hours.

The purified block copolymer may be isolated using any known means. For example, the purified block copolymer may be isolated by filtering the solution to separate the purified block copolymer from the filtrate. Alternatively, the purified block copolymer may be isolated by centrifugation. Optionally, unreacted monomer and catalyst may then be recovered from the filtrate. For example, unreacted monomer may be recovered from the filtrate by distillation of the filtrate or by precipitation of the unreacted monomer from the filtrate.

The purified block copolymer may be dried, if needed, to remove traces of the alcohol or alcohol and water mixture used for trituration. This may be carried out through prolonged drying in air or under vacuum, or by heating the purified block copolymer in the air, for example, in an oven, or by heating under reduced pressured, for example, in a vacuum oven.

Block Copolymer Properties

The above described purification method reduces or eliminates the amount of impurities present in the purified block copolymers compared to that contained in their crude block copolymer counterparts, while retaining control over the polydispersity index (PDI), molecular weight (Mw), and number average molecular weight (Mn).

As used herein, "impurities" refers to unreacted monomers, left-over catalyst, unreacted initiator, or oligomer structures of low molecular weight.

The properties of the block copolymers may be determined by any suitable technique and apparatus and are not limited to the instruments and techniques indicated herein.

With respect to impurities, from about 80 to about 99 wt %, such as from about 80 to about 88 wt %, from about 86 to about 95 wt %, or from about 92 to about 99 wt %, or about 100 wt %, of the impurities may be removed from the crude block copolymer as a result of the purification method. The amount of impurities remaining in the purified block copolymers may be from about 0 to about 5 wt % of the total weight of the purified block copolymer, such as from about 0 to about 2 wt %, from about 0 to about 1 wt %, or from about 0 to about 0.5 wt %.

The polydispersity index (PDI) of a material is the ratio of the weight-average molecular weight (Mw) of the material to the number-average molecular weight (Mn) of the material. The PDI of the crude block copolymer may be from about 1 to about 2, such as from about 1.1 to about 1.24, from about 1.2 to about 1.4, or from about 1.28 to about 1.5. The PDI of the purified block copolymer may be from about 1.0 to about 1.3, such as from about 1.0 to about 1.14, from about 1.15 to about 1.20, or from about 1.17 to about 1.3. Thus, a ratio of the PDI of the crude block copolymer to the PDI of the purified block copolymer may be from about 1.02 to about 1.25, such as from about 1.02 to about 1.1, from about 1.06 to about 1.18, or from about 1.12 to about 1.25, thus showing that the PDI of the copolymer is substantially maintained after purification.

The molecular weight (Mw) of the crude block copolymer may be from about 2,000 to about 50,000, such as from about 2,000 to about 11,000, from about 8,000 to about 14,000, or from about 12,000 to about 20,000. The Mw of the purified block copolymer may be from about 3,000 to about 22,000, such as from about 3,000 to about 13,000, from about 9,000 to about 15,000, or from about 10,000 to about 22,000. Thus, a ratio of the Mw of the crude block copolymer to a Mw of the purified block copolymer may be from about 0.75 to about 1.0, such as from about 0.75 to about 0.86, from about 0.84 to about 0.96, from about 0.94 to about 1.0, or about 0.99, thus indicating that the molecular weight of the block copolymer is maintained after purification.

The number average molecular weight (Mn) of the crude block copolymer may be from about 2,000 to about 18,000, such as from about 2,000 to about 9,000, from about 8,000 to about 16,000, or from about 10,000 to about 30,000. The Mn of the purified block copolymer may be from about 3,000 to about 20,000, such as from about 3,000 to about 10,000, from about 7,000 to about 13,000, or from about 11,000 to about 20,000. Thus, a ratio of the Mn of the crude block copolymer to a Mn of the purified block copolymer may be from about 0.65 to about 1.0, such as from about 0.65 to about 0.80, from about 0.75 to about 0.90, from about 0.85 to about 1.0, or about 0.99, thus indicating that the number average molecular weight of the block copolymer is maintained after purification.

EXAMPLES

The following Examples illustrate embodiments of the present disclosure, and are not intended to limit the scope of the present disclosure. Also, parts and percentages are by weight unless otherwise indicated. As used herein, "room temperature" refers to a temperature of from about 20° C. to about 30° C.

Example 1

Purification of a Crude Triblock Copolymer Generated Via a One-Pot, Neat, Organocatalytic Ring-Opening Polymerization 98 mg (0.8 mmol, 0.02 eq) of DMAP, 218 mg (0.8 mmol, 0.02 eq) of DMAP:$HO_3SCF_3$, 4.60 g (0.040 mol, 1 eq) of ε-caprolactone, and 100 μL (82 mg, 0.8 mmol, 0.02 eq) of hexanol were added to a 20 mL vial equipped with a magnetic stir bar. The mixture was heated in an oil bath to a temperature of 135° C. The first block was allowed to polymerize over 47 hours, at which time 2.0 g (0.008 mol, 0.2 eq) of a benzyl-carboxy trimethylene carbonate monomer was added. The second block was allowed to polymerize for 30 min, and then 5.80 g (0.040 mmol, 1 eq) of D,L-lactide was added. The third block was allowed to polymerize for 30 min. Then, 160 mg (0.0016 mol, 0.04 eq) of succinic anhydride was added to the mixture and allowed to react for 5 min.

The resulting clear melt was poured into a 125 mL Erlenmeyer flask and allowed to cool to room temperature. 70 mL of methanol was added to the crude solid, and the mixture was heated to reflux on a hot plate until no white precipitate was observed. The solution was then cooled in a freezer for 12 hours, and the suspension was filtered and dried in vacuo to yield 4.3 g of a pure triblock copolymer as a white solid.

As shown in FIG. 1, a GPC analysis of the pure triblock copolymer (Example 1B) versus the crude triblock copolymer (Example 1A) shows an absence of low molecular weight impurities, while maintaining the same average molecular weight, confirming that the purification method not only purified the triblock copolymer, but it also maintained low polydispersity and controlled the molecular weight of the triblock copolymer. The following Table 1 shows the number average molecular weight (Mn), the weight average molecular weight (Mw), and the polydispersity index (PDI) of the crude and purified triblock copolymers.

TABLE 1

| Example 1 Samples | Mn | Mw | PDI |
| --- | --- | --- | --- |
| Crude Triblock Copolymer | 9929 | 11626 | 1.17 |
| Purified Triblock Copolymer | 10134 | 11702 | 1.15 |

Figure 2:
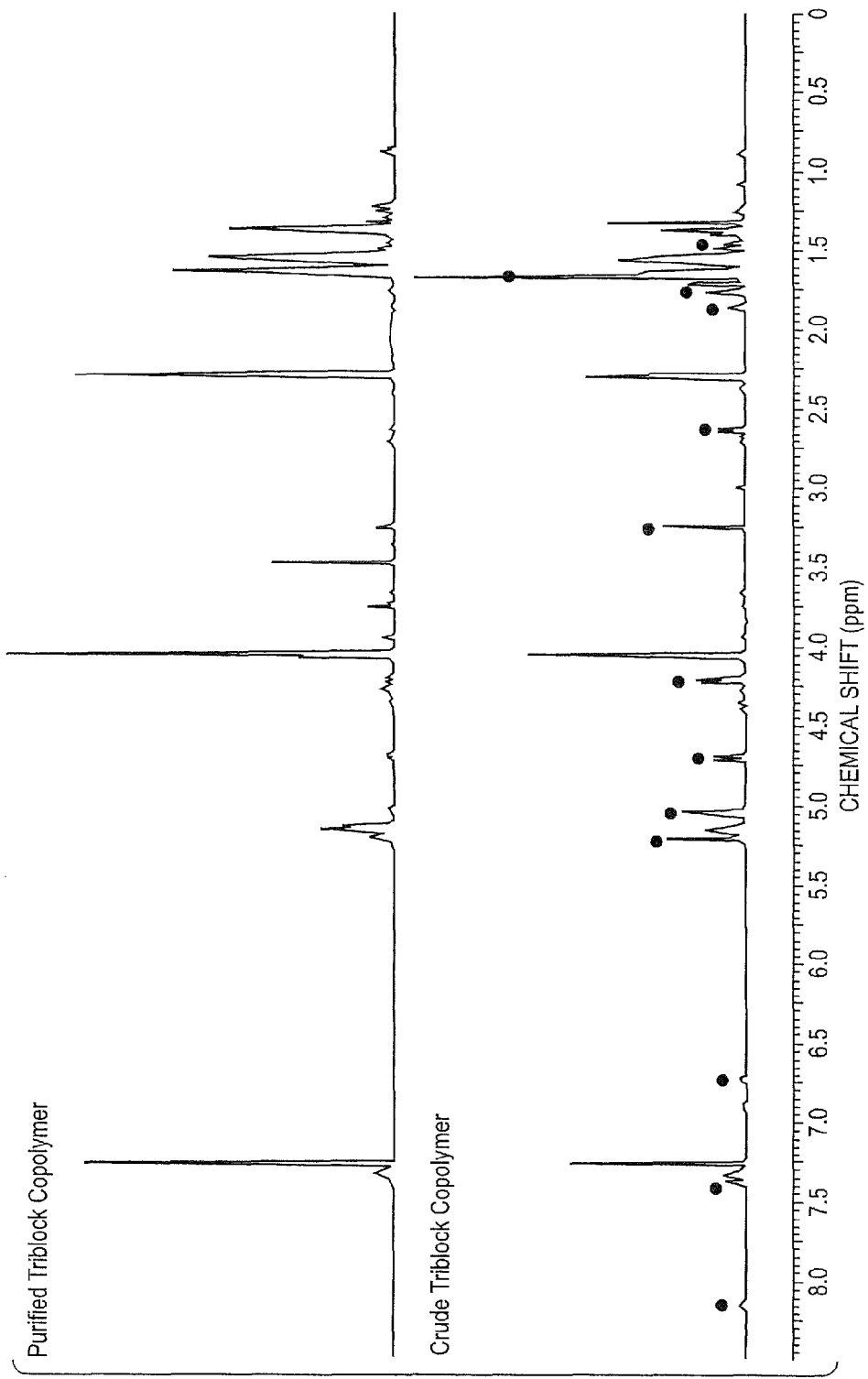
FIG. 2 shows a hydrogen nuclear magnetic resonance ($^1$H NMR) spectra of crude and pure triblock copolymers.

Furthermore, the HNMR analysis results shown in FIG. 2 confirm the removal of the catalyst and the unreacted monomer impurities from the purified triblock copolymer Example 1B when compared to the crude triblock copolymer Example 1A.

Examples 2-8

Examples 2-8 were performed similarly to Example 1, but with varying ratios of the monomers used to form the block copolymer, as shown below in Table 2.

TABLE 2

| | Relative molecular ratios of monomers used | | |
| --- | --- | --- | --- |
| Example Number | Caprolactone | Substituted trimethylene carbonate | Lactide |
| 2 | 25 | 10 | 0 |
| 3 | 100 | 0 | 0 |
| 4 | 25 | 5 | 50 |
| 5 | 25 | 10 | 25 |
| 6 | 25 | 10 | 0 |
| 7 | 0 | 10 | 40 |
| 8 | 50 | 10 | 25 |

The results of Examples 2-8 are shown below in Table 3.

TABLE 3

| Example | Sample | Mn | Mw | PDI |
| --- | --- | --- | --- | --- |
| Example 2 | Crude | 3768 | 5129 | 1.36 |
| | Pure | 5621 | 6452 | 1.14 |
| Example 3 | Crude | 7364 | 10529 | 1.42 |
| | Pure | 10315 | 12464 | 1.20 |
| Example 4 | Crude | 10456 | 12812 | 1.22 |
| | Pure | 12981 | 14815 | 1.14 |
| Example 5 | Crude | 6205 | 7304 | 1.17 |
| | Pure | 7730 | 8525 | 1.10 |
| Example 6 | Crude | 5248 | 6524 | 1.24 |
| | Pure | 6697 | 7545 | 1.12 |
| Example 7 | Crude | 3481 | 4272 | 1.22 |
| | Pure | 4994 | 5567 | 1.11 |
| Example 8 | Crude | 7049 | 9936 | 1.25 |
| | Pure | 7850 | 9263 | 1.17 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of purifying a block copolymer comprising:
heating a solution containing a crude block copolymer and an alcohol;
cooling the solution to promote precipitation of a purified block copolymer; and
isolating the purified block copolymer, wherein isolating the purified block copolymer comprises filtering the solution to separate the purified block copolymer from a filtrate and recovering unreacted monomer and catalyst from the filtrate,
and further wherein:
an amount of impurities remaining in the purified block copolymer is from about 0 to about 5 wt % based on a total weight of the purified block copolymer;
a ratio of a polydispersity index of the crude block copolymer to a polydispersity index of the purified block copolymer is from about 1.02 to about 1.25;
a ratio of a molecular weight of the crude block copolymer to a molecular weight of the purified block copolymer is from about 0.75 to about 1.0; and
a ratio of a number average molecular weight of the crude block copolymer to a number average molecular weight of the purified block copolymer is from about 0.65 to about 1.

2. The method of claim 1, wherein the block copolymer is a functionalized block copolymer of a polyester/polycarbonate hybrid.

3. The method of claim 2, wherein the block copolymer is a polycaprolactone-b-polycarbonate-b-polylactide block copolymer.

4. The method of claim 1, wherein the alcohol is methanol.

5. The method of claim 1, wherein the solution is heated to a temperature of from about 50° C. to about 120° C.

6. The method of claim 1, wherein the solution is cooled to a temperature of from about −30° C. to about 10° C.

7. A method of making a block copolymer comprising:
forming a crude block copolymer;
heating a solution containing the crude block copolymer and alcohol;
cooling the solution to promote precipitation of a purified block copolymer; and
isolating the purified block copolymer, wherein isolating the purified block copolymer comprises filtering the solution to separate the purified block copolymer from a filtrate and recovering unreacted monomer and catalyst from the filtrate,
and further wherein:
an amount of impurities remaining in the purified block copolymer is from about 0 to about 5 wt % based on a total weight of the purified block copolymer;
a ratio of a polydispersity index of the crude block copolymer to a polydispersity index of the purified block copolymer is from about 1.02 to about 1.25,
a ratio of a molecular weight of the crude block copolymer to a molecular weight of the purified block copolymer is from about 0.75 to about 1.0; and
a ratio of a number average molecular weight of the crude block copolymer to a number average molecular weight of the purified block copolymer is from about 0.65 to about 1.0.

8. The method of claim 7, wherein forming the crude block copolymer comprises a one-pot, organocatalytic, neat ring-opening polymerization.

9. The method of claim 8 further comprising polymerizing the mixture to form a block copolymer, wherein the polymerization comprises:
sequentially adding monomers to a reactor to form a mixture;
capping the mixture with succinic anhydride; and
cooling the mixture to room temperature to form the crude block copolymer.

10. The method of claim 9, wherein sequentially adding monomers comprises:
adding ε-caprolactone, and a catalyst to the reactor to form a first reaction mixture;
heating the first reaction mixture;
polymerizing a first block;
adding a functionalized carbonate monomer to the reactor to form a second reaction mixture;
polymerizing a second block;
adding D,L-lactide to the reactor to form a third reaction mixture; and
polymerizing a third block.

11. The method of claim 7, wherein the block copolymer is a functionalized block copolymer of a polyester/polycarbonate hybrid.

12. The method of claim 11, wherein the block copolymer is a polycaprolactone-b-polycarbonate-b-polylactide block copolymer.

13. The method of claim 7, wherein the alcohol is methanol.

14. The method of claim 7, wherein the solution is heated to a temperature of from about 50° C. to about 120° C.

15. A one-pot method of making an ABC tri-block copolymer, the method comprising:
adding ε-caprolactone, hexanol, and a catalyst to a reactor vessel to form a first reaction mixture;
heating the first reaction mixture at a temperature within a range of from about 125° C. to about 145° C. for about 36 to about 72 hours to ring-open and polymerize the ε-caprolactone, forming a reaction mixture comprising an A block polymer;
adding a functionalized carbonate monomer to the reaction mixture comprising the A block polymer to form a second reaction mixture;
maintaining the second reaction mixture at a temperature within a range of from about 125° C. to about 145° C. for about 20 to about 40 minutes to ring-open and polymerize the functionalized carbonate monomer with the A block, forming a reaction mixture comprising an AB block copolymer;
adding D,L-lactide to the reaction mixture comprising the AB block copolymer to form a third reaction mixture;
maintaining the third reaction mixture at a temperature within a range of from about 125° C. to about 145° C. for about 20 to about 40 minutes to ring-open and polymerize the D,L-lactide with the AB block copolymer, forming a reaction mixture comprising an ABC tri-block copolymer;
adding succinic anhydride to the reaction mixture comprising the ABC tri-block copolymer to form a fourth reaction mixture;
maintaining the fourth reaction mixture at a temperature within a range of from about 125° C. to about 145° C. for about 2 to about 12 minutes to cap the ABC tri-block copolymer with the succinic anhydride to form a clear melt comprising a capped ABC tri-block copolymer;
cooling the clear melt to room temperature to form a crude solid;
adding methanol to the crude solid to form a solution;

heating the solution containing the crude solid and methanol to a temperature of from about 130° C. to about 140° C. and refluxing for about 0.1 to about 1 hours;

cooling the refluxed solution to a temperature of from about −30° C. to about 10° C. for about 8 to about 20 hours; and isolating a solid from the cooled reflux solution to obtain a purified capped ABC tri-block copolymer;

wherein:

the purified copolymer is a polycaprolactone-b-polycarbonate-b-polylactide block copolymer;

a ratio of a polydispersity index of the crude solid to a polydispersity index of the purified copolymer is from about 1.02 to about 1.25;

a ratio of a molecular weight of the crude solid to a molecular weight of the purified block copolymer is from about 0.75 to about 1.0;

a ratio of a number average molecular weight of the crude solid to a number average molecular weight of the purified copolymer is from about 0.65 to about 1.0; and an amount of impurities remaining in the purified copolymers is from about 0 to about 5 wt % based on a total weight of the purified copolymer.

* * * * *